US 12,195,109 B2

(12) United States Patent
Zhao et al.

(10) Patent No.: US 12,195,109 B2
(45) Date of Patent: Jan. 14, 2025

(54) ACTIVE FAULT TOLERANCE AND FAULT MITIGATION SYSTEM BASED ON STEER-BY-WIRE WITH DUAL MOTORS AND CONTROL METHOD THEREFOR

(71) Applicant: NANJING UNIVERSITY OF AERONAUTICS AND ASTRONAUTICS, Nanjing (CN)

(72) Inventors: Wanzhong Zhao, Nanjing (CN); An Wang, Nanjing (CN); Xiaochuan Zhou, Nanjing (CN); Chunyan Wang, Nanjing (CN); Lijuan Chen, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 753 days.

(21) Appl. No.: 17/258,378

(22) PCT Filed: Nov. 6, 2019

(86) PCT No.: PCT/CN2019/116041
§ 371 (c)(1),
(2) Date: Jan. 6, 2021

(87) PCT Pub. No.: WO2020/125249
PCT Pub. Date: Jun. 25, 2020

(65) Prior Publication Data
US 2021/0269087 A1 Sep. 2, 2021

(30) Foreign Application Priority Data

Dec. 18, 2018 (CN) .......................... 201811549717.6
Dec. 18, 2018 (CN) .......................... 201822131629.6

(51) Int. Cl.
B62D 5/04 (2006.01)
B62D 3/12 (2006.01)
B62D 5/00 (2006.01)
B62D 6/00 (2006.01)
B62D 15/02 (2006.01)

(52) U.S. Cl.
CPC ............. *B62D 5/0484* (2013.01); *B62D 3/12* (2013.01); *B62D 5/006* (2013.01); *B62D 5/0421* (2013.01);
(Continued)

(58) Field of Classification Search
None
See application file for complete search history.

(56) References Cited

U.S. PATENT DOCUMENTS

2003/0233181 A1   12/2003   Colosky
2006/0009894 A1*  1/2006   Goto ..................... B62D 6/003
                                                              701/41
(Continued)

FOREIGN PATENT DOCUMENTS

CN   102320325 A       1/2012
CN   102320325         10/2017
(Continued)

OTHER PUBLICATIONS

Nah et al., "Fault-tolerant driving control of a steer-by-wire system for six-wheel-driving-six-wheel-steering vehicles", Institution of Mechanical Engineers: Journal of Automobile Engineering, 2013, pp. 506-520 (Year: 2013).*
(Continued)

*Primary Examiner* — Tamara L Weber
(74) *Attorney, Agent, or Firm* — Treasure IP Group, LLC

(57) ABSTRACT

An active fault tolerance and fault mitigation system based on steer-by-wire dual motors and a mode switching control method thereof are provided. The system includes an acquisition unit, a steering wheel assembly, an ECU control
(Continued)

module, a front wheel steering assembly, and a fault tolerance controller (18) which are sequentially connected. The acquisition unit transmits an acquired vehicle signal to the ECU control module, and then a corresponding compensation strategy is selected by means of a fault tolerance control strategy unit, a yaw rate calculation unit, a stability control unit, and a dual-motor compensation unit to act on a rack and pinion mechanism (15). The system and method can perform switching in an active fault tolerance and fault mitigation mode to achieve optimal control of the real-time performance of a vehicle, thereby ensuring the driving performance and higher performance of the vehicle in a field fault condition.

4 Claims, 3 Drawing Sheets

(52) U.S. Cl.
 CPC ......... *B62D 5/0463* (2013.01); *B62D 5/0487* (2013.01); *B62D 6/008* (2013.01); *B62D 15/021* (2013.01)

(56) References Cited

U.S. PATENT DOCUMENTS

| 2006/0122796 A1* | 6/2006 | McLaughlin | G01R 31/006 702/58 |
|---|---|---|---|
| 2019/0047618 A1* | 2/2019 | Hultén | B60W 10/30 |
| 2020/0001912 A1* | 1/2020 | Abuaita | B62D 1/181 |
| 2020/0088596 A1* | 3/2020 | Hwang | B62D 5/006 |

FOREIGN PATENT DOCUMENTS

| CN | 108248676 | 7/2018 |
|---|---|---|
| CN | 108964523 | 12/2018 |
| CN | 109733464 A | 5/2019 |
| WO | 2017102131 | 6/2017 |

OTHER PUBLICATIONS

He et al., "Fault Tolerant Control Method of Dual Steering Actuator Motors for Steer-by-Wire System", International Journal of Automotive Technology, vol. 16, No. 6, 2015, pp. 977-987 (Year: 2015).*

* cited by examiner

ACTIVE FAULT TOLERANCE AND FAULT MITIGATION SYSTEM BASED ON STEER-BY-WIRE WITH DUAL MOTORS AND CONTROL METHOD THEREFOR

TECHNICAL FIELD

The present invention relates to the technical field of steer-by-wire systems and a fault tolerance control system, and more particularly relates to a fault tolerance method, having a function of switching operating modes according to different fault conditions of motors and capable of ensuring good vehicle steering performance and enhancing the fault-tolerant ability of system in time when vehicle gets in fault.

BACKGROUND ART

At present, two modes including hardware redundancy and software redundancy are commonly used for vehicle fault tolerance. For the hardware redundancy, when a vehicle fails, a replacing mode can be used for replacing fault hardware with new hardware, so as to ensure the normal driving of the vehicle. However, the hardware redundancy mode will increase the economic cost of the vehicle, is lack of consideration of a real-time fault condition of the vehicle, cannot realize the real-time optimal allocation of the vehicle, and is a conservative fault tolerance mode. The software redundancy is a mode of reducing the development cost of the hardware redundancy. A core mode of the software redundancy is an active fault tolerance mode. In this mode, through identification and derivation of other groups of correct data, measured wrong data caused by failure of a sensor will be replaced with derived approximately correct data, so that chain errors caused by some sensor failure can be avoided, and the fault tolerance development cost can be greatly reduced. However, some executors are not suitable to be completely replaced with an active fault tolerance mode, because the faults of some executors may directly affect the execution effect of the vehicle. For example, when a single-steering execution motor of the vehicle fails, the influence caused by the failure of the steering motor cannot be replaced by only using the active fault tolerance mode. And the normal driving and optimum control of the vehicle when steering execution motor fails under the field condition cannot be ensured.

The active fault tolerance mode cannot solve the executor fault problem. The vehicle real-time optimization problem cannot be solved by the single hardware redundancy mode or by combining the hardware redundancy with the active fault tolerance mode, and the fault executor resource waste may be caused.

SUMMARY OF THE INVENTION

In order to overcome the defects of an existing fault tolerance technology and the prior art, the present invention provides a novel fault tolerance idea: fault mitigation, and provides an active fault tolerance and fault mitigation system based on steer-by-wire dual execution motors and a mode switching method thereof on the basis of the idea. On the basis of ensuring safety, the safety and reliability of the system and the real-time advantages of the performance are greatly improved in a mode of combining hardware redundancy, active fault tolerance and fault mitigation. The perfect compatibility of the vehicle safety and reliability is realized. The problem that the vehicle cannot operate or the performance sharp declines under a single-motor fault condition is solved. The problem of fault motor performance waste due to too conservative mode where a fault motor is directly isolated by a hardware redundancy and active fault tolerance technology is solved. The problem that the vehicle real-time optimum performance cannot be realized according to the vehicle fault type in the vehicle driving process is further solved.

The present invention is realized through the following technical solution:

Firstly, the present invention provides an active fault tolerance and fault mitigation system based on steer-by-wire dual motors. The system includes: an acquisition unit, a steering wheel assembly, an ECU control module, and a dual-motor execution unit.

The acquisition unit is respectively connected with the ECU control module, the steering wheel assembly and the dual-motor execution unit. The acquisition unit includes sensors acquiring a vehicle state such as a steering wheel steering angle sensor 4, a steering wheel torque sensor 5, a front wheel steering angle sensor 9, a front wheel torque sensor 12, a vehicle speed sensor 19, and a yaw rate sensor. Additionally, acquired signals or instructions are respectively transmitted to the ECU control module, the steering wheel assembly, and the dual-motor execution unit. Specifically, the acquisition unit transmits a vehicle speed signal, a steering wheel steering angle signal, a steering motor steering angle signal acquired by the steering speed sensor, a torque motor torque signal acquired by the torque sensor, a vehicle yaw rate signal acquired by the yaw rate sensor, a steering angle signal of steering front wheels and the like in the vehicle driving process to an electronic control unit and a yaw rate calculation unit in real time, sends resistance, voltage and current signals of a steering angle motor and a torque motor to a motor fault diagnosis unit, transmits an instruction sent by the fault diagnosis unit to a fault tolerance control strategy unit, and sends signals such as a difference value signal of the ideal yaw rate and the practical yaw rate acquired by the yaw rate calculation unit, pavement disturbance and lateral wind disturbance to a dual-motor fault tolerance compensation control unit.

The ECU control module is respectively connected with the acquisition unit, the dual-motor execution unit, and the steering wheel assembly, and mainly includes an operation controller 7 and a fault tolerance controller 18. The operation controller 7 includes a motor fault diagnosis unit and an electronic control unit. The fault tolerance controller 18 is a fault tolerance controller, including a fault tolerance control strategy unit, a yaw rate calculation unit, a stability control unit and a dual-motor fault tolerance compensation unit.

The ECU control module receives signals from the acquisition unit, and transmits corresponding instructions to the dual-motor execution unit to act after calculation. Specifically, the motor fault diagnosis unit is a self-adaptive Kalman filter aiming at realizing online distinguishment of the resistance, current and voltage of the steering angle motor and the torque motor. The motor fault diagnosis unit judges the states of the motors according to the real-time resistance, current and voltage signals of the steering angle motor and the torque motor transmitted from the acquisition unit, and transmits the practical voltage and current signals of the motors to the fault tolerance controller.

The fault tolerance controller performs corresponding fault tolerance compensation control strategies for different motor faults in an active fault tolerance and fault mitigation mode according to signals transmitted from the motor fault diagnosis unit. The yaw rate calculation unit calculates an ideal yaw rate signal according to the steering wheel signal and the vehicle speed signal transmitted from the acquisition unit, calculates an ideal yaw rate difference value to be regulated according to the ideal yaw rate signal and the practical yaw rate signal, and transmits the yaw rate difference value to the stability control unit. The stability control unit comprehensively considers the influence of pavement disturbance, lateral wind, system friction and the like on the vehicle stability according to the yaw rate difference value transmitted from the yaw rate calculation unit. From system robustness, the compensation torque is obtained on the premise of ensuring the vehicle stability, and is transmitted to the dual-motor fault tolerance compensation unit. The dual-motor fault tolerance compensation unit receives a compensation torque signal transmitted from the stability control unit, and controls the torque motor 13 to act through the torque motor controller 16 according to the fault tolerance strategy of the fault tolerance control strategy unit, so as to compensate the system, thus realizing the active fault tolerance or fault mitigation.

The steering wheel assembly includes a steering wheel 1, a steering column 2, a road-feeling motor 3 and a road-feeling motor controller 6. The steering wheel 1 is connected with the road-feeling motor 3 and the steering wheel steering angle sensor 4 through the steering column 2. The steering wheel torque sensor 5 is arranged on the steering column 2. The road-feeling motor controller 6 is connected with the road-feeling motor 3 and the steering wheel torque sensor 5, and controls the operation of the road-feeling motor 3.

The dual-motor execution unit includes a steering angle motor controller 8, a steering angle motor 10, a bipolar reducer 11, a torque motor controller 16, a torque motor 13, a reducer 14, a rack and pinion mechanism 15 and front wheels 17 which are sequentially connected. The steering angle motor 10, the torque motor 13, the bipolar reducer 11 and the reducer 14 are connected with the rack and pinion mechanism 15. The front wheels 17 are arranged at two sides of the rack and pinion mechanism 15. The front wheel steering angle sensor 9 is arranged on the front wheel 17. The steering angle sensor 9 and the front wheel torque sensor 12 are connected with a Flexray bus to input signals of the steering angle motor controller 8 and the torque motor controller 16 into the bus, and then transmit the signals into the fault tolerance controller 18 through the bus. The steering angle motor 10 and the deceleration mechanism 11 thereof are connected with the steering angle motor controller 8. The steering angle motor controller 8 controls the operation of the steering angle motor 10 and the bipolar reducer 11. The torque motor 13 and the reducer 14 are connected with the torque motor controller 16. The torque motor controller 16 controls the operation of the torque motor 13 and the reducer 14. An output end of the fault tolerance controller 18 is respectively connected with an input end of the road-feeling motor controller 6 and the Flexray bus. The fault tolerance controller 18 receives the signals of the front wheel torque motor sensor 12, the front wheel steering angle motor sensor 9 and the steering wheel torque sensor 5 transmitted to the Flexray bus and signals of the operation controller 7, performs robustness control and compensation strategy control, inputs instructions into the Flexray bus, and transmits the instructions to the steering angle motor controller 8 and the torque motor controller 16 so as to make corresponding motors act.

Secondly, the present invention further provides a mode switching control method of the active fault tolerance and fault mitigation system based on steer-by-wire dual motors. The method includes the following steps:

step 1: in a driving process of a vehicle, transmitting, by an acquisition unit, resistance $R_2$ and $R_3$ and current signals $I_2$ and $I_3$ of a steering angle motor and a torque motor to a motor fault diagnosis unit; and judging, by the motor fault diagnosis unit, a motor state according to the magnitudes of the resistance and the current, outputting a relationship T=f(I) between the current and the torque of the motor, and transmitting an instruction to a fault tolerance control strategy unit;

step 2: receiving, by the fault tolerance control strategy unit, a diagnosis result from the fault diagnosis unit, so as to obtain an operation state condition of the steering angle motor or the torque motor, and determining whether to use an active fault tolerance strategy 1, or an active fault tolerance strategy 2, or a fault mitigation strategy 1, or a fault mitigation strategy 2 by comparing a voltage $U_2$ of the steering angle motor and a voltage $U_3$ of the torque motor to a reference threshold $U_0$;

step 3: calculating, by a yaw rate calculation unit, a real-time ideal yaw rate signal $\omega_r^*$ according to a steering wheel steering angle signal $\delta_{sw}$ and a vehicle speed signal u acquired in real time by the acquisition unit in accordance with a variable transmission ratio rule, then calculating an ideal yaw rate difference value $\Delta\omega_r$ to be regulated according to the ideal yaw rate signal $\omega_r^*$ and a practical yaw rate signal $\omega_r$, and transmitting the yaw rate difference value $\Delta\omega_r$ to a stability control unit;

acquiring, by the yaw rate calculation unit, the practical yaw rate $\omega_r$ by inputting the real-time vehicle speed u and a front wheel steering angle into a whole vehicle steering two-freedom model:

$$\begin{pmatrix} \dot{\beta} \\ \dot{\omega}_r \end{pmatrix} = \begin{pmatrix} \dfrac{k_1+k_2}{mu} & \dfrac{1}{mu^2}(ak_1 - bk_2 - mu^2) \\ \dfrac{ak_1 - bk_2}{I_Z} & \dfrac{1}{uI_Z}(a^2 k_1 + b^2 k_2) \end{pmatrix} \begin{pmatrix} \beta \\ \omega_r \end{pmatrix} - \begin{pmatrix} \dfrac{k_1}{mu} \\ \dfrac{ak_1}{I_Z} \end{pmatrix} \delta_f, \text{ and} \quad (1)$$

$$\Delta\omega_r = \omega_r - \omega_r^*, \quad (2)$$

(2), wherein in Formula (1), m is vehicle mass, Iz is rotational inertia of the vehicle around an axis z, $k_1$ and $k_2$ are respectively cornering stiffness of front and rear wheels, $\delta_f$ is the front wheel steering angle, a and b are respectively distances from front and rear axles to a vehicle mass center, u is the advancing speed of the vehicle, $\omega_r$ is the yaw rate, and $\beta$ is a sideslip angle;

step 4: receiving, by the stability control unit, the yaw rate difference value $\Delta\omega_r$ input from a yaw rate control unit; converting the value into a corresponding compensation torque $T_1$; and by integrating a compensation torque $T_2$ caused by pavement disturbance and a compensation torque $T_3$ caused by system friction and considering system stability control factors, using a μ comprehensive robustness controller for control, so as to improve the external disturbance resistance capability of the system, and transmitting a compensation torque $\Delta T$ to a dual-motor compensation unit:

$$\Delta T = \Delta T_1 + \Delta T_2 + \Delta T_3 \quad (3), \text{ wherein}$$

$\Delta T$ is a total compensation torque, $\Delta T_1$ is a compensation torque required for compensating the yaw rate difference value, $\Delta T_2$ is a compensation torque caused by pavement disturbance, and $\Delta T_3$ is a compensation torque caused by system friction; and step 5: receiving, by a fault tolerance controller, a compensation torque T from the stability control unit, and by receiving a fault tolerance strategy transmitted from the fault tolerance controller, selecting a corresponding compensation strategy to act on a dual-motor execution unit and a steering wheel assembly, so as to ensure a good yaw rate control effect and high stability of the vehicle.

Further, the mode switching control method of the active fault tolerance and fault mitigation system based on steer-by-wire dual motors further includes: building the motor fault diagnosis unit in step 1. The on-line distinguishment of the resistance, current and voltage of the steering angle motor and the torque motor can be realized by designing a self-adaptive Kalman filter.

For a discrete linear system:

$$x(k)=Ax(k-1)+B(u(k)+w(k)) \quad (4), \text{ and}$$

$$y_v(k)=Cx(k)+v(k) \quad (5).$$

In Formulas (4) and (5), x(k) is a system state at a moment k, x(k−1) is a system state at a moment k−1, A and B are system parameters, u(k) is the quantity of control over the system at the moment k, w(k) is a process noise signal, v(k) is a measurement noise signal, $y_v(k)$ is a measured value of the system at the moment k, and C is a matrix.

A discrete Kalman filter recursive algorithm is as follows:

$$Mn(k)=P(k)C^T/[CP(k)C^T+R] \quad (6),$$

$$P(k)=AP(k-1)A^T+BQB^T \quad (7),$$

$$P(k)=(En-Mn(k)C)P(k) \quad (8),$$

$$x(k)=Ax(k-1)+Mn(k)(y_v(k)-CAx(k-1)) \quad (9), \text{ and}$$

$$y_e(k)=Cx(k) \quad (10).$$

In Formulas (6) to (10), x(k) is a system state at a moment k, x(k−1) is a system state at a moment k−1, A, B and R are system parameters, C is a matrix, $A^T$ is a transposed matrix of a matrix A, $B^T$ is a transposed matrix of a matrix B, $C^T$ is a transposed matrix of the matrix C, $y_e(k)$ is an output signal modified by the Kalman filter, P(k) is a covariance of the system at the moment k, P(k−1) is a covariance of the system at the moment k−1, En is a unit vector, and Mn(k) is an intermediate variable.

En is the unit vector, and the covariance errcov(k) of the system error is as follows:

$$\text{err cov}(k)=CP(k)C^T \quad (11).$$

In Formula (11), errcov(k) is the covariance of the system error, C is a matrix, $C^T$ is a transposed matrix of the matrix C, and P(k) is a covariance of the system at a moment k.

According to the Kirchhoff voltage law, a loop model of the steering angle motor and the torque motor is built.

An electrical equation of the steering angle motor is as follows:

$$u_2=Li_{a2}+i_{a2}R_2+k_{b2}\dot{\delta}_{m2} \quad (12).$$

In Formula (12), L is an inductance of the steering motor, $R_2$ is the resistance of the steering motor, $k_{b2}$ is an electromotive force constant, $u_2$ is the input voltage of the steering angle motor, $i_{a2}$ is the current of the steering angle motor, $\dot{\delta}_{m2}$ is a steering angle acceleration of the steering angle motor, and $k_{b2}$ is stiffness of the steering angle motor.

An electrical equation of the torque motor is as follows:

$$u_3=Li_{a3}+i_{a3}R_3+k_{b3}\dot{\delta}_{m3} \quad (13).$$

In the formula, L is an inductance of the torque motor, $R_3$ is the resistance of the torque motor, $k_{b3}$ is an electromotive force constant, $u_3$ is the input voltage of the torque motor, $i_{a3}$ is the current of the torque motor, $\dot{\delta}_{m3}$ is a steering angle acceleration of the torque motor, and $k_{b3}$ is stiffness of the steering angle motor.

The self-adaptive Kalman filter transmits the voltage, current and resistance signals of the steering angle motor and the torque motor to the fault tolerance control strategy unit.

Further, a flow process of four real-time fault tolerance control strategies, the active fault tolerance strategy 1, or the active fault tolerance strategy 2, or the fault mitigation strategy 1, or the fault mitigation strategy 2, formed in step 2 includes:

Step 2.1: The Kalman filter can judge the fault of the steering angle motor or the torque motor by monitoring the resistance fluctuation beyond the normal range. Through consideration from motor performance optimization, when the maximum voltage output by the motor is greater than a safety margin voltage, i.e., $U>=0.5\ U_{max}$, and $U_0=0.5\ U_{max}$, it can be regarded that the motor is capable of achieving partial functions to output a certain torque, the torque T=f(I), this is the premise of the fault mitigation strategy. The higher voltage output capability is also the guarantee of the motor to perform compensation.

Through consideration from safety, in order to prevent a condition that the steering angle motor or the torque motor cannot output sufficient torque in time, when the maximum voltage of the motor is smaller than the safety margin, i.e., $U<=0.5\ U_{max}$, and $U_0=0.5\ U_{max}$, it can be regarded that the fault motor is incapable of functioning, the fault motor is incapable of completing the compensation, and at the moment, the system isolates the fault motor, and performs active fault tolerance strategy control.

Step 2.2: 0 is defined to represent that the steering angle motor normally operates, 1 is defined to represent that the steering angle motor half normally operates, 2 is defined to represent that the steering angle motor is unable to operate, and totally fails, 3 is defined to represent that the torque motor normally operates, 4 is defined to represent that the torque motor half normally operates, and 5 is defined to represent that the torque motor is unable to operate, and totally fails. Half normal operation represents $U_2>=U_0$ or $U_3>=U_0$. A fault vector table is formed according to fault conditions of the steering angle motor and the torque motor. The fault vector table includes the operation states and the corresponding fault conditions of the steering angle motor and the torque motor. The fault vector table is as follows:

| Fault vector table | |
|---|---|
| Fault vector | Fault conditions |
| 03 | Two motors: normal |
| 25 | Two motors: totally failed |
| 04 | Steering angle motor: normal; torque motor: half normal |
| 13 | Steering angle motor: half normal; torque motor: normal |
| 05 | Steering angle motor: normal; torque motor: totally failed |
| 23 | Steering angle motor: totally failed; torque motor: normal |

-continued

Fault vector table

| Fault vector | Fault conditions |
| --- | --- |
| 15 | Steering angle motor: half normal; torque motor: totally failed |
| 24 | Steering angle motor: totally failed; torque motor: half normal |
| 14 | Steering angle motor: half normal; torque motor: half normal |

The fault tolerance strategies used in step 2 specifically include:

1) When both of the steering angle motor and the torque motor normally operate, the two motors jointly act to control the front wheel steering angle and the vehicle yaw rate. At the moment, the fault tolerance strategy is not needed. Under the condition that the two motors normally operate, the analysis of the rack movement is as follows:

A movement differential equation of a rack is as follows:

$$m_{rack}\ddot{y}_{rack} + 2K_L\left(\frac{y_{rack}}{r_p} - \delta_f\right) \bigg/ r_L + B_{rack}\dot{y}_{rack} + F_{frrack} = \quad (14)$$

$$(T_{g2} + T_{g3}) * G/r_p.$$

In the formula, $m_{rack}$ is mass of the rack, $y_{rack}$ is displacement of the rack, $r_L$ is offset of a main pin shaft, $K_L$ stiffness of steering linkages, $B_{rack}$ is a damping coefficient of the rack, $F_{frrack}$ is friction between systems, G is a reduction ratio of a double-reducer mechanism, $T_{g2}$ is an output torque of a steering motor 2, $T_{g3}$ is an output torque of a steering motor 3, $\ddot{y}_{rack}$ is an acceleration of the rack, and $\dot{y}_{rack}$ is a movement speed of the rack.

A movement differential equation of the wheels is as follows:

$$J_w\ddot{\delta}_f + T_{frkp} + B_{kp}\dot{\delta}_f + M_z = K_L\left(\frac{y_{rack}}{r_p} - \delta_f\right). \quad (15)$$

In Formula (15), $J_w$ is rotational inertia of the front wheels, $T_{frkp}$ is a friction torque, $B_{kp}$ is a damping coefficient of a main pin, $\ddot{\delta}_f$ is a steering angle acceleration of steering front wheels, $\dot{\delta}_f$ is an angular speed of the steering front wheels, and $M_z$ is an aligning torque of the wheels.

2) When the steering angle motor is normal, and the torque motor is half normal, the system uses the fault mitigation strategy 1, the steering angle motor mainly performs vehicle yaw rate control, and the torque motor compensates the compensation torque $\Delta T_1$ fed back from the yaw rate controller.

Comprehensive $\Delta T_1 = \Delta T_{11} + \Delta T_{21} + \Delta T_{31}$ (16).

$\Delta T_1$ is a total compensation torque, $T_{11}$ is a compensation torque required for compensating the yaw rate difference value, $T_{21}$ is a compensation torque caused by pavement disturbance, and $T_{31}$ is a compensation torque caused by system friction.

$$m_{rack}\ddot{y}_{rack} + 2K_L\left(\frac{y_{rack}}{r_p} - \delta_f\right) \bigg/ r_L + B_{rack}\dot{y}_{rack} + F_{frrack} = \quad (17)$$

$$T_{g2} * G/r_p + (T_{g3} + \Delta T_1) * G/r_p.$$

In Formula (17), $m_{rack}$ is mass of the rack, $y_{rack}$ is displacement of the rack, $r_L$ is offset of a main pin shaft, $K_L$ is stiffness of steering linkages, $B_{rack}$ is a damping coefficient of the rack, $F_{frrack}$ is friction between systems, G is a reduction ratio of a double-reducer mechanism, $T_{g2}$ is an output torque of a steering motor 2, and $T_{g3}$ is an output torque of the steering motor 3.

3) When the steering angle motor is half normal, and the torque motor is normal, the fault mitigation strategy 2 is used. The torque motor serves as the steering angle motor to perform main control, and the steering angle motor serves as the torque motor to compensate the compensation torque $\Delta T_2$ fed back from the yaw rate controller.

Comprehensive $\Delta T_2 = \Delta T_{12} + \Delta T_{22} + \Delta T_{32}$ (18).

$\Delta T_2$ is a total compensation torque, $T_{12}$ is a compensation torque required for compensating the yaw rate difference value, $T_{22}$ is a compensation torque caused by pavement disturbance, and $T_{32}$ is a compensation torque caused by system friction.

$$m_{rack}\ddot{y}_{rack} + 2K_L\left(\frac{y_{rack}}{r_p} - \delta_f\right) \bigg/ r_L + B_{rack}\dot{y}_{rack} + F_{frrack} = \quad (19)$$

$$(T_{g2} + \Delta T_2) * G/r_p + T_{g3} * G/r_p.$$

4) When the steering angle motor is normal, and the torque motor totally fails, the active fault tolerance strategy 1 is used. The current input of the torque motor is cut off, the steering angle motor singly controls to compensate the compensation torque $\Delta T_3$ fed back from the yaw rate controller.

Comprehensive $\Delta T_3 = \Delta T_{13} + \Delta T_{23} + \Delta T_{33}$ (20).

$\Delta T_3$ is a total compensation torque, $T_{13}$ is a compensation torque required for compensating the yaw rate difference value, $T_{23}$ is a compensation torque caused by pavement disturbance, and $T_{33}$ is a compensation torque caused by system friction.

$$m_{rack}\ddot{y}_{rack} + 2K_L\left(\frac{y_{rack}}{r_p} - \delta_f\right) \bigg/ r_L + B_{rack}\dot{y}_{rack} + F_{frrack} = \quad (21)$$

$$(T_{g2} + \Delta T_3) * G/r_p.$$

In Formula (21), $m_{rack}$ is mass of the rack, $y_{rack}$ is displacement of the rack, $r_L$ is offset of a main pin shaft, $K_L$ is stiffness of steering linkages, $B_{rack}$ is a damping coefficient of the rack, $F_{frrack}$ is friction between systems, G is a reduction ratio of a double-reducer mechanism, $T_{g2}$ is an output torque of a steering motor 2, and $T_{g3}$ is an output torque of the steering motor 3.

5) When the steering angle motor totally fails, and the torque motor is normal, the active fault tolerance strategy 2 is used. The current input of the steering angle motor is cut off, the torque motor singly controls. The torque motor servers as the steering angle motor to compensate the compensation torque $\Delta T_4$ fed back from the yaw rate controller.

$$\text{Comprehensive } \Delta T_4 = \Delta T_{14} + \Delta T_{24} + \Delta T_{34} \quad (22).$$

$\Delta T_4$ is a total compensation torque, $T_{14}$ is a compensation torque required for compensating the yaw rate difference value, $T_{24}$ is a compensation torque caused by pavement disturbance, and $T_{34}$ is a compensation torque caused by system friction.

$$m_{rack}\ddot{y}_{rack} + 2K_L\left(\frac{y_{rack}}{r_p} - \delta_f\right)\bigg/r_L + B_{rack}\dot{y}_{rack} + F_{frack} = \quad (23)$$
$$(T_{g3} + \Delta T_4) * G/r_p.$$

6) When the two motors are both normal, the fault tolerance strategy does not need to be used. When the two motors both fail (half normal, or totally failed), the probability is very small, and this condition is not within the discussion scope of the present application.

Further, according to the mode switching control method of the active fault tolerance and fault mitigation system based on steer-by-wire dual motors, in step 4, a control framework of the μ comprehensive robustness controller includes:

a) Yaw rate tracking, $\|Z_1\|_2 = \|W_1(\omega_r^* - \omega_r)\|_2$      (24).

$W_1$ is a weighting function, and is generally set into a low-pass filter $$W_1 = k_1(as+b)/(cs+d) \quad (25).$$

In Formulas (24) and (25), $\|Z_1\|_2$ is a norm 2 of evaluation output of a controlled object, $\omega_r^*$ is an ideal yaw rate value, $\omega_r$ is a practical vehicle yaw rate value, $W_1$ is a weighting function, and a, s, b, a and d are parameters of the low-pass filter.

The μ comprehensive robustness controller should be capable of fast tracking the difference value of the ideal yaw rate and the practical yaw rate at different fault tolerance strategies, and should be capable of realizing better disturbance inhibition on external disturbance such as pavement disturbance and lateral wind disturbance, or outputting the corresponding compensation torque and transmitting the compensation torque $\Delta T$ to the dual-motor compensation unit.

b) Compensation feedback, and stability control:
$$\Delta T = \Delta T_1 + \Delta T_2 + \Delta T_3 \quad (26).$$

$\Delta T$ is a total compensation torque, $\Delta T_1$ is a compensation torque required for compensating the yaw rate difference value, $\Delta T_2$ is a compensation torque caused by pavement disturbance, and $\Delta T_3$ is a compensation torque caused by system friction.

In the present invention, the fault tolerance idea of fault mitigation is proposed relative to a traditional fault tolerance idea. The traditional research idea is to use a hardware redundancy or software redundancy mode. For the hardware redundancy, it is considered to replace the fault hardware with new hardware, so as to separate the wrong hardware from the system, or the software redundancy mode is used to replace the hardware redundancy, and data of the fault component is replaced with calculation data of other sensors or executors through derivation. In the practical process, this is a conservative fault tolerance mode. The essence is a replacing relationship. The new component is used for replacing the fault component, and other data is used for replacing the wrong data. The vehicle at the moment can be regarded as "disease-free operating". However, rest functions of the fault component are not sufficiently developed and are wasted. For example, after the motor fails, it does not completely break down, and a part of function can be used to output a certain torque. By aiming at different fault conditions, the fault motor and the normal motor can operate at the same time. The vehicle at the moment can be regarded as "disease-suffering operating". The present application realizes the vehicle real-time optimum control through the matching and comparison of the fault motor and the normal motor. Additionally, the vehicle can be enabled to realize good workability and performance in an extreme field environment at the same time. Guarantee is provided for the vehicle to reach a nearest repair center to be repaired.

Compared with the prior art, the active fault tolerance and fault mitigation system based on steer-by-wire dual motors and the fault tolerance mode switching control method thereof provided by the present invention have the advantages that various steering mode functions are realized in a vehicle steer-by-wire system, steering mode switching is performed according to different faults of vehicle steering execution dual motors, and real-time optimal control of the vehicle is realized. The unification of economic efficiency and flexibility of the steer-by-wire vehicle is realized. Additionally, the rest functions of the fault components are sufficiently used. Resources are saved. Wide market application prospects are realized.

In the figures, 1 denotes a steering wheel; 2 denotes a steering column; 3 denotes a road-feeling motor; 4 denotes a steering wheel steering angle sensor; 5 denotes a steering wheel torque sensor; 6 denotes a road-feeling motor controller; 7 denotes an operation controller; 8 denotes a steering angle motor controller; 9 denotes a front wheel steering angle sensor; 10 denotes a steering angle motor; 11 denotes a bipolar reducer; 12 denotes a front wheel torque sensor; 13 denotes a torque motor; 14 denotes a reducer; 15 denotes a rack and pinion mechanism; 16 denotes a torque motor controller; 17 denotes a front wheel; 18 denotes a fault tolerance controller; and 19 denotes a vehicle speed sensor.

DETAILED DESCRIPTION OF THE INVENTION

For the purpose of facilitating the understanding of those skilled in the art, the present invention is further illustrated in conjunction with instances and drawings, and the description in implementations is not intended to limit the present invention.

Figure 1:
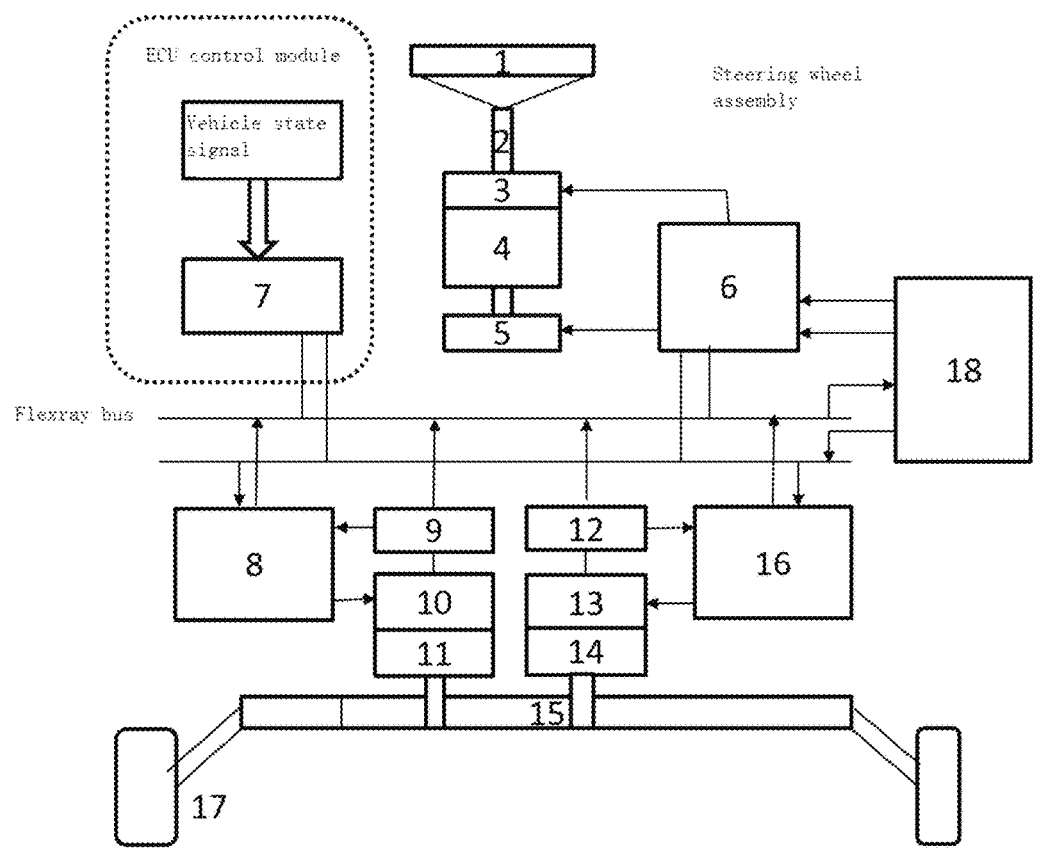
FIG. 1 is a structural layout diagram of a system based on steer-by-wire dual motors of the present invention.

With reference to a layout diagram of an active fault tolerance and fault migration system based on steer-by-wire dual motors of the present invention on a vehicle body as shown in FIG. 1, the system includes an acquisition unit, a steering wheel assembly, an ECU control module (model:

MT20U2, may also use M7 or MT20U in specific implementations), and a dual-motor execution unit.

The acquisition unit is respectively connected with the ECU control module, the steering wheel assembly and the dual-motor execution unit. The acquisition unit includes sensors acquiring a vehicle state such as a steering wheel steering angle sensor 4, a steering wheel torque sensor 5, a front wheel steering angle sensor 9, a front wheel torque sensor 12, a vehicle speed sensor 19, and a yaw rate sensor. The acquisition unit transmits a vehicle speed signal, a steering wheel steering angle signal, a steering motor steering angle signal acquired by the steering speed sensor, a torque motor torque signal acquired by the torque sensor, a vehicle yaw rate signal acquired by the yaw rate sensor, a steering angle signal of steering front wheels and the like in the vehicle driving process to an electronic control unit and a yaw rate calculation unit in real time, sends resistance, voltage and current signals of a steering angle motor and a torque motor to a motor fault diagnosis unit, transmits an instruction sent by the fault diagnosis unit to a fault tolerance control strategy unit, and sends signals such as a difference value signal of the ideal yaw rate and the practical yaw rate acquired by the yaw rate calculation unit, pavement disturbance and lateral wind disturbance to a dual-motor fault tolerance compensation control unit.

The ECU control module is respectively connected with the acquisition unit, the dual-motor execution unit, and the steering wheel assembly, and mainly includes an operation controller 7 and a fault tolerance controller 18. The operation controller 7 includes a motor fault diagnosis unit and an electronic control unit. The fault tolerance controller 18 is a fault tolerance controller, including a fault tolerance control strategy unit, a yaw rate calculation unit, a stability control unit and a dual-motor fault tolerance compensation unit.

The ECU control module receives signals from the acquisition unit, and transmits corresponding instructions to the dual-motor execution unit to act after calculation. Specifically, the motor fault diagnosis unit is a self-adaptive Kalman filter aiming at realizing online distinguishment of the resistance, current and voltage of the steering angle motor and the torque motor. The motor fault diagnosis unit judges the states of the motors according to the real-time resistance, current and voltage signals of the steering angle motor and the torque motor transmitted from the acquisition unit, and transmits the practical voltage and current signals of the motors to the fault tolerance controller.

The fault tolerance controller performs corresponding fault tolerance compensation control strategies for different motor faults in an active fault tolerance and fault mitigation mode according to signals transmitted from the motor fault diagnosis unit. The yaw rate calculation unit calculates an ideal yaw rate signal according to the steering wheel steering angle signal and the vehicle speed signal transmitted from the acquisition unit, calculates an ideal yaw rate difference value to be regulated according to the ideal yaw rate signal and the practical yaw rate signal, and transmits the yaw rate difference value to the stability control unit. The stability control unit comprehensively considers the influence of pavement disturbance, lateral wind, system friction and the like on the vehicle stability according to the yaw rate difference value transmitted from the yaw rate calculation unit. From system robustness, the compensation torque is obtained on the premise of ensuring the vehicle stability, and is transmitted to the dual-motor fault tolerance compensation unit. The dual-motor fault tolerance compensation unit receives a compensation torque signal transmitted from the stability control unit, and controls the torque motor 13 to act through the torque motor controller 16 according to the fault tolerance strategy of the fault tolerance control strategy unit, so as to compensate the system, thus realizing the active fault tolerance or fault mitigation.

The steering wheel assembly is respectively connected with the acquisition unit and the ECU control module. The steering wheel assembly includes a steering wheel 1, a steering column 2, a road-feeling motor 3 and a road-feeling motor controller 6. The steering wheel 1 is connected with the road-feeling motor 3 and the steering wheel steering angle sensor 4 through the steering column 2. The steering wheel torque sensor 5 is arranged on the steering column 2. The road-feeling motor controller 6 is connected with the road-feeling motor 3 and the steering wheel torque sensor 5, and controls the operation of the road-feeling motor 3.

The dual-motor execution unit is respectively connected with the acquisition unit and the ECU control module. The dual-motor execution unit includes a steering angle motor controller 8, a steering angle motor 10, a bipolar reducer 11, a torque motor controller 16, a torque motor 13, a reducer 14, a rack and pinion mechanism 15, and front wheels 17 which are sequentially connected. The steering angle motor 10, the torque motor 13, the bipolar reducer 11 and the reducer 14 are connected with the rack and pinion mechanism 15. The front wheels 17 are arranged at two sides of the rack and pinion mechanism 15. The front wheel steering angle sensor 9 is arranged on the front wheel 17. The steering angle sensor 9 and the front wheel torque sensor 12 are connected with a Flexray bus to input signals of the steering angle motor controller 8 and the torque motor controller 16 into the bus, and then transmit the signals into the fault tolerance controller 18 through the bus. The steering angle motor 10 and the deceleration mechanism 11 thereof are connected with the steering angle motor controller 8. The steering angle motor controller 8 controls the operation of the steering angle motor 10 and the bipolar reducer 11. The torque motor 13 and the reducer 14 are connected with the torque motor controller 16. The torque motor controller 16 controls the operation of the torque motor 13 and the reducer 14. An output end of the fault tolerance controller 18 is respectively connected with an input end of the road-feeling motor controller 6 and the Flexray bus. The fault tolerance controller 18 receives the signals of the front wheel torque motor sensor 12, the front wheel steering angle motor sensor 9 and the steering wheel torque sensor 5 transmitted to the Flexray bus and signals of the operation controller 7, performs robustness control and compensation strategy control, inputs instructions into the Flexray bus, and transmits the instructions to the steering angle motor controller 8 and the torque motor controller 16 so as to make corresponding motors act.

Figure 2:
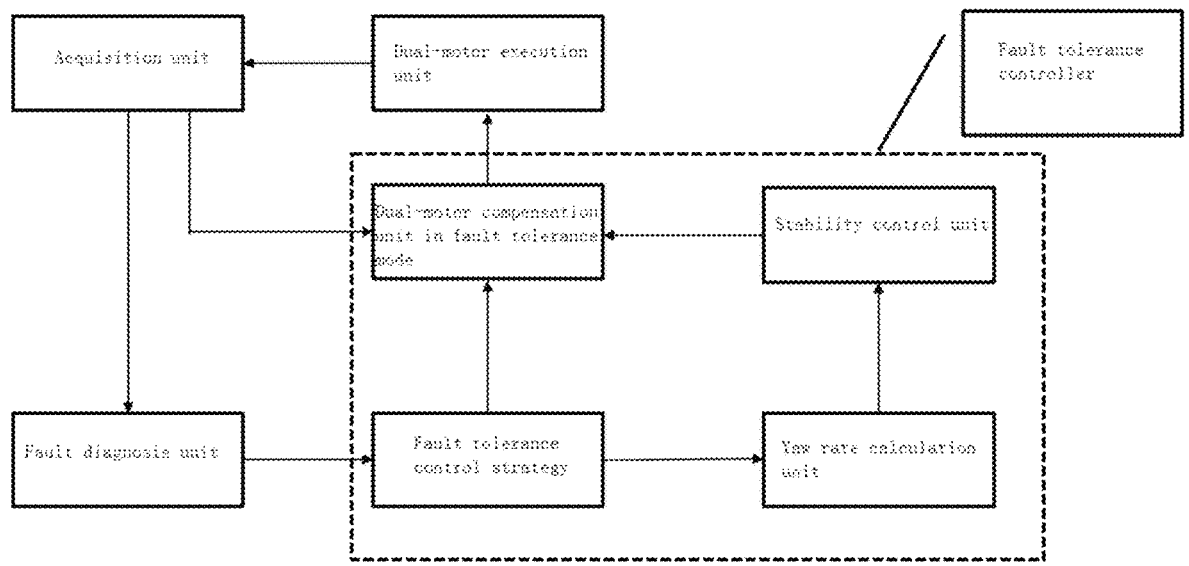
FIG. 2 is a principle diagram of a control device of an active fault tolerance and fault mitigation system based on the steer-by-wire dual motors of the present invention.
Figure 3:
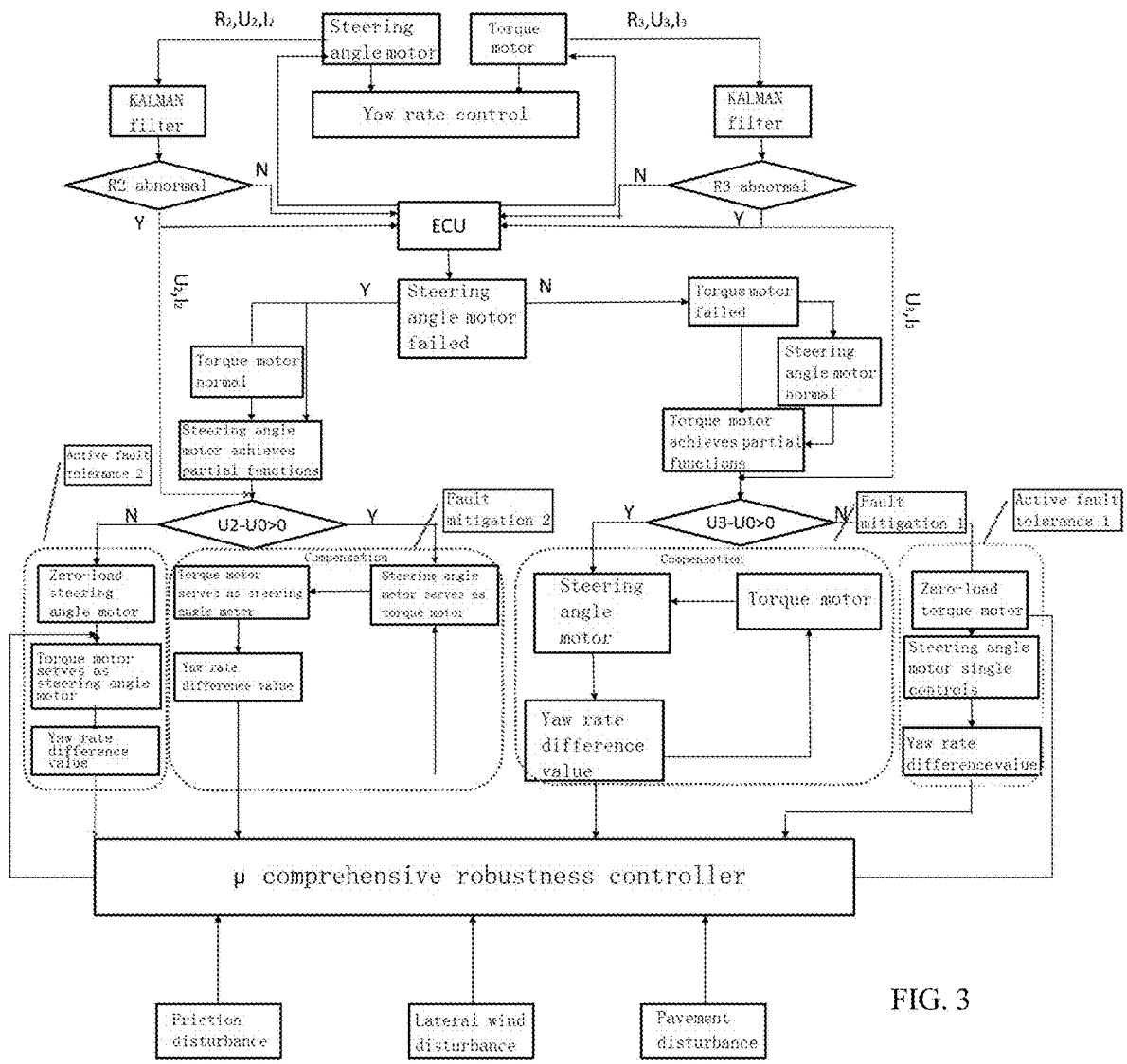
FIG. 3 is a general view of a control strategy of the active fault tolerance and fault mitigation system based on the steer-by-wire dual motors of the present invention.

FIG. 2 and FIG. 3 are a principle diagram of a control device of the active fault tolerance and fault mitigation system based on the steer-by-wire dual motors, and a general view of a control strategy of the active fault tolerance and fault mitigation system based on the steer-by-wire dual motors. A control flow process of the present invention is as follows:

Step 1: In a driving process of a vehicle, an acquisition unit transmits resistance $R_2$ and $R_3$ and current signals $I_2$ and $I_3$ of a steering angle motor and a torque motor to a motor fault diagnosis unit. The motor fault diagnosis unit judges a motor state according to the magnitudes of the resistance and the current, outputs a relationship $T=f(I)$ between the current and the torque of the motor, and transmits an instruction (the voltage, current and resistance signal of the torque motor) to a fault tolerance control strategy unit.

The motor fault diagnosis unit includes a self-adaptive Kalman filter aiming at realizing online distinguishment of the resistance, current and voltage of the steering angle motor and the torque motor.

For a discrete linear system:

$$x(k)=Ax(k-1)+B(u(k)+w(k)) \quad (4), \text{ and}$$

$$y_v(k)=Cx(k)+v(k) \quad (5).$$

In Formulas (4) and (5), $x(k)$ is a system state at a moment $k$. $x(k-1)$ is a system state at a moment $k-1$. A and B are system parameters. $u(k)$ is the quantity of control over the system at the moment $k$. $w(k)$ is a process noise signal. $v(k)$ is a measurement noise signal. $y_v(k)$ is a measured value of the system at the moment $k$. C is a matrix.

A discrete Kalman filter recursive algorithm is as follows:

$$Mn(k)=P(k)C^T/[CP(k)C^T+R] \quad (6),$$

$$P(k)=AP(k-1)A^T+BQB^T \quad (7),$$

$$P(k)=(En-Mn(k)C)P(k) \quad (8),$$

$$x(k)=Ax(k-1)+Mn(k)(y_v(k)-CAx(k-1)) \quad (9), \text{ and}$$

$$y_e(k)=Cx(k) \quad (10).$$

In Formulas (6) to (10), $x(k)$ is a system state at a moment $k$. $x(k-1)$ is a system state at a moment $k-1$. A, B and R are system parameters. C is a matrix. $A^T$ is a transposed matrix of a matrix A. $B^T$ is a transposed matrix of a matrix B. $C^T$ is a transposed matrix of the matrix C. $y_e(k)$ is an output signal modified by the Kalman filter. $P(k)$ is a covariance of the system at the moment $k$. $P(k-1)$ is a covariance of the system at the moment $k-1$. En is a unit vector. $Mn(k)$ is an intermediate variable.

En is the unit vector, and the covariance $errcov(k)$ of the system error is as follows:

$$err\ cov(k)=CP(k)C^T \quad (11).$$

In Formula (11), $errcov(k)$ is the covariance of the system error. C is a matrix. $C^T$ is a transposed matrix of the matrix C. $P(k)$ is a covariance of the system at a moment $k$.

According to the Kirchhoff voltage law, a loop model of the steering angle motor and the torque motor is built.

An electrical equation of the steering angle motor is as follows:

$$u_2=Li_{a2}+i_{a2}R_2+k_{b2}\dot{\delta}_{m2} \quad (12).$$

In Formula (12), L is an inductance of the steering motor. $R_2$ is the resistance of the steering motor. $k_{b2}$ is an electromotive force constant. $u_2$ is the input voltage of the steering angle motor. $i_{a2}$ is the current of the steering angle motor. $\dot{\delta}_{m2}$ is a steering angle acceleration of the steering angle motor. $k_{b2}$ is stiffness of the steering angle motor.

An electrical equation of the torque motor is as follows:

$$u_3=Li_{a3}+i_{a3}R_3+k_{b3}\dot{\delta}_{m3} \quad (13).$$

In the formula, L is an inductance of the torque motor. $R_3$ is the resistance of the torque motor. $k_{b3}$ is an electromotive force constant. $u_3$ is the input voltage of the torque motor. $i_{a3}$ is the current of the torque motor. $\dot{\delta}_{m3}$ is a steering angle acceleration of the torque motor. $k_{b3}$ is stiffness of the steering angle motor.

Step 2: The fault tolerance control strategy unit receives a diagnosis result from the fault diagnosis unit, so as to obtain an operation state condition of the steering angle motor or the torque motor. Whether to use an active fault tolerance strategy 1, or an active fault tolerance strategy 2, or a fault mitigation strategy 1, or a fault mitigation strategy 2 is determined by comparing a voltage $U_2$ of the steering angle motor and a voltage $U_3$ of the torque motor to a reference threshold $U_0$.

A flow process of the active fault tolerance strategy 1, or the active fault tolerance strategy 2, or the fault mitigation strategy 1, or the fault mitigation strategy 2 includes:

Step 2.1: The Kalman filter can judge the fault of the steering angle motor or the torque motor by monitoring the resistance fluctuation beyond the normal range. Through consideration from motor performance optimization, when the maximum voltage output by the motor is greater than a safety margin voltage, i.e., $U \gg = 0.5\ U_{max}$, and $U_0 = 0.5\ U_{max}$, it can be regarded that the motor is capable of achieving partial functions to output a certain torque, the torque $T=f(I)$, this is the premise of the fault mitigation strategy. The higher voltage output capability is also the guarantee of the motor to perform compensation.

Through consideration from safety, in order to prevent a condition that the steering angle motor or the torque motor cannot output sufficient torque in time, when the maximum voltage of the motor is smaller than the safety margin, i.e., $U <= 0.5\ U_{max}$, and $U_0 = 0.5\ U_{max}$, it can be regarded that the fault motor is incapable of functioning, the fault motor is incapable of completing the compensation, and at the moment, the system isolates the fault motor, and performs active fault tolerance strategy control.

Step 2.2: 0 is defined to represent that the steering angle motor normally operates, 1 is defined to represent that the steering angle motor half normally operates, 2 is defined to represent that the steering angle motor is unable to operate, and totally fails, 3 is defined to represent that the torque motor normally operates, 4 is defined to represent that the torque motor half normally operates, and 5 is defined to represent that the torque motor is unable to operate, and totally fails. Half normal operation represents $U_2 \gg= U_0$ or $U_3 \gg= U_0$. A fault vector table is formed according to fault conditions of the steering angle motor and the torque motor. The fault vector table includes the operation states and the corresponding fault conditions of the steering angle motor and the torque motor. The fault vector table is as follows:

| Fault vector table | |
|---|---|
| Fault vector | Fault conditions |
| 03 | Two motors: normal |
| 25 | Two motors: totally failed |
| 04 | Steering angle motor: normal; torque motor: half normal |
| 13 | Steering angle motor: half normal; torque motor: normal |
| 05 | Steering angle motor: normal; torque motor: totally failed |
| 23 | Steering angle motor: totally failed; torque motor: normal |
| 15 | Steering angle motor: half normal; torque motor: totally failed |
| 24 | Steering angle motor: totally failed; torque motor: half normal |
| 14 | Steering angle motor: half normal; torque motor: half normal |

The fault tolerance strategies used in step 2 specifically include:

1) When both of the steering angle motor and the torque motor normally operate, the two motors jointly act to control the front wheel steering angle and the vehicle yaw rate. At the moment, the fault tolerance strategy is not needed. Under the condition that the two motors normally operate, the analysis of the rack movement is as follows:

A movement differential equation of a rack is as follows:

$$m_{rack}\ddot{y}_{rack} + 2K_L\left(\frac{y_{rack}}{r_p} - \delta_f\right)\bigg/ r_L + B_{rack}\dot{y}_{rack} + F_{frrack} = \quad (14)$$

$$(T_{g2} + T_{g3})*G/r_p.$$

In the formula, $m_{rack}$ is mass of the rack. $y_{rack}$ is displacement of the rack. $r_L$ is offset of a main pin shaft. $K_L$ stiffness of steering linkages. $B_{rack}$ is a damping coefficient of the rack. $F_{frrack}$ is friction between systems. G is a reduction ratio of a double-reducer mechanism. $T_{g2}$ is an output torque of a steering motor 2. $T_{g3}$ is an output torque of a steering motor 3. $\ddot{y}_{rack}$ is an acceleration of the rack. $\dot{y}_{rack}$ is a movement speed of the rack.

A movement differential equation of the wheels is as follows:

$$J_w\ddot{\delta}_f + T_{frkp} + B_{kp}\dot{\delta}_f + M_z = K_L\left(\frac{y_{rack}}{r_p} - \delta_f\right). \quad (15)$$

In Formula (15), $J_w$ is rotational inertia of the front wheels. $T_{frkp}$ is a friction torque. $B_{kp}$ is a damping coefficient of a main pin. $\ddot{\delta}_f$ is a steering angle acceleration of steering front wheels. $\dot{\delta}_f$ is an angular speed of the steering front wheels. $M_z$ is an aligning torque of the wheels.

2) When the steering angle motor is normal, and the torque motor is half normal, the system uses the fault mitigation strategy 1, the steering angle motor mainly performs vehicle yaw rate control, and the torque motor compensates the compensation torque $\Delta T_1$ fed back from the yaw rate controller.

Comprehensive $\Delta T_1 = \Delta T_{11} + \Delta T_{21} + \Delta T_{31}$ (16).

$\Delta T_1$ is a total compensation torque. $T_{11}$ is a compensation torque required for compensating the yaw rate difference value. $T_{21}$ is a compensation torque caused by pavement disturbance. $T_{31}$ is a compensation torque caused by system friction.

$$m_{rack}\ddot{y}_{rack} + 2K_L\left(\frac{y_{rack}}{r_p} - \delta_f\right)\bigg/ r_L + B_{rack}\dot{y}_{rack} + F_{frrack} = \quad (17)$$

$$T_{g2}*G/r_p + (T_{g3} + \Delta T_1)*G/r_p.$$

In Formula (17), $m_{rack}$ is mass of the rack. $y_{rack}$ is displacement of the rack. $r_L$ is offset of a main pin shaft. $K_L$ is stiffness of steering linkages. $B_{rack}$ is a damping coefficient of the rack. $F_{frrack}$ is friction between systems. G is a reduction ratio of a double-reducer mechanism. $T_{g2}$ is an output torque of a steering motor 2. $T_{g3}$ is an output torque of the steering motor 3.

3) When the steering angle motor is half normal, and the torque motor is normal, the fault mitigation strategy 2 is used. The torque motor serves as the steering angle motor to perform main control, and the steering angle motor serves as the torque motor to compensate the compensation torque $\Delta T_2$ fed back from the yaw rate controller.

Comprehensive $\Delta T_2 = \Delta T_{12} + \Delta T_{22} + \Delta T_{32}$ (18).

$\Delta T_2$ is a total compensation torque. $T_{12}$ is a compensation torque required for compensating the yaw rate difference value. $T_{22}$ is a compensation torque caused by pavement disturbance. $T_{32}$ is a compensation torque caused by system friction.

$$m_{rack}\ddot{y}_{rack} + 2K_L\left(\frac{y_{rack}}{r_p} - \delta_f\right)\bigg/ r_L + B_{rack}\dot{y}_{rack} + F_{frrack} = \quad (19)$$

$$(T_{g2} + \Delta T_2)*G/r_p + T_{g3}*G/r_p.$$

4) When the steering angle motor is normal, and the torque motor totally fails, the active fault tolerance strategy 1 is used. The current input of the torque motor is cut off, the steering angle motor singly controls to compensate the compensation torque $\Delta T_3$ fed back from the yaw rate controller.

Comprehensive $\Delta T_3 = \Delta T_{13} + \Delta T_{23} + \Delta T_{33}$ (20).

$\Delta T_3$ is a total compensation torque. $T_{13}$ is a compensation torque required for compensating the yaw rate difference value. $T_{23}$ is a compensation torque caused by pavement disturbance. $T_{33}$ is a compensation torque caused by system friction.

$$m_{rack}\ddot{y}_{rack} + 2K_L\left(\frac{y_{rack}}{r_p} - \delta_f\right)\bigg/ r_L + B_{rack}\dot{y}_{rack} + F_{frrack} = \quad (21)$$

$$(T_{g3} + \Delta T_4)*G/r_p.$$

In Formula (21), $m_{rack}$ is mass of the rack. $y_{rack}$ is displacement of the rack. $r_L$ is offset of a main pin shaft. $K_L$ is stiffness of steering linkages. $B_{rack}$ is a damping coefficient of the rack. $F_{frrack}$ is friction between systems. G is a reduction ratio of a double-reducer mechanism. $T_{g2}$ is an output torque of a steering motor 2. $T_{g3}$ is an output torque of the steering motor 3.

5) When the steering angle motor totally fails, and the torque motor is normal, the active fault tolerance strategy 2 is used. The current input of the steering angle motor is cut off, the torque motor singly controls. The torque motor servers as the steering angle motor to compensate the compensation torque $\Delta T_4$ fed back from the yaw rate controller.

Comprehensive $\Delta T_4 = \Delta T_{14} + \Delta T_{24} + \Delta T_{34}$ (22).

$\Delta T_4$ is a total compensation torque. $T_{14}$ is a compensation torque required for compensating the yaw rate difference value. $T_{24}$ is a compensation torque caused by pavement disturbance. $T_{34}$ is a compensation torque caused by system friction.

$$m_{rack}\ddot{y}_{rack} + 2K_L\left(\frac{y_{rack}}{r_p} - \delta_f\right)\bigg/ r_L + B_{rack}\dot{y}_{rack} + F_{frrack} = \quad (23)$$

$$(T_{g3} + \Delta T_4)*G/r_p.$$

6) When the two motors are both normal, the fault tolerance strategy does not need to be used. When the two motors both fail (half normal, or totally failed), the probability is very small, and this condition is not within the discussion scope of the present application.

Figure 4:
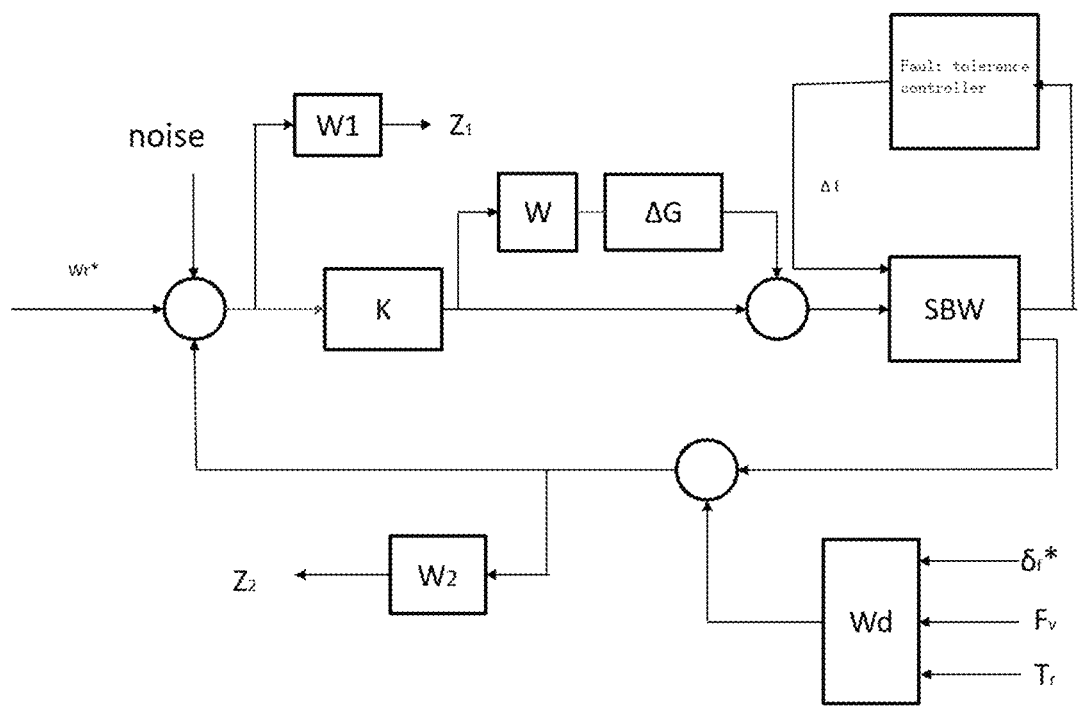
FIG. 4 is a block diagram of a stability control system of a vehicle with the steer-by-wire dual motors and a fault tolerance function based on yaw rate feedback.

Further, according to the mode switching control method of the active fault tolerance and fault mitigation system based on steer-by-wire dual motors, in step 4, a control block diagram of the μ comprehensive robustness controller is as shown in FIG. 4. In FIG. 4, K is a controller. The perturbation input $\omega_r^*$ of the system is the ideal yaw rate. The disturbance input is the ideal front wheel steering $\delta_r^*$, the lateral wind disturbance $F_y$, and the pavement disturbance torque $T_r$. $W_1$ and $W_2$ are weighting functions, and are generally set into a high-pass filter. $W_d$ is a disturbance weighting matrix. $\Delta G$ is unknown parameter perturbation. $\Delta I$ is a compensation current. $z_1$ and $z_2$ are evaluation output.

Specifically, a control framework of the μ comprehensive robustness controller includes:

a) Yaw rate tracking, $\|Z_1\|_2 = \|W_1(\omega_r^* - \omega_r)\|_2$ (24).

$W_1$ is a weighting function, and is generally set into a low-pass filter $$W_1 = k_1(as+b)/(cs+d) \quad (25).$$

In Formulas (24) and (25), $\|Z_1\|_2$ is a norm 2 of evaluation output of a controlled object. $\omega_r^*$ is an ideal yaw rate value. $\omega_r$ is a practical vehicle yaw rate value. $W_1$ is a weighting function. a, s, b, a and d are parameters of the low-pass filter.

The μ comprehensive robustness controller should be capable of fast tracking the difference value of the ideal yaw rate and the practical yaw rate at different fault tolerance strategies, and should be capable of realizing better disturbance inhibition on external disturbance such as pavement disturbance and lateral wind disturbance, or outputting the corresponding compensation torque and transmitting the compensation torque $\Delta T$ to the dual-motor compensation unit.

b) Compensation feedback, and stability control:
$$\Delta T = \Delta T_1 + \Delta T_2 + \Delta T_3 \quad (26).$$

$\Delta T$ is a total compensation torque. $\Delta T_1$ is a compensation torque required for compensating the yaw rate difference value. $\Delta T_2$ is a compensation torque caused by pavement disturbance. $\Delta T_3$ is a compensation torque caused by system friction.

Step 3: A yaw rate calculation unit calculates a real-time ideal yaw rate signal $\omega_r^*$ according to a steering wheel steering angle signal $\delta_{sw}$ and a vehicle speed signal u acquired in real time by the acquisition unit in accordance with a variable transmission ratio rule, then calculates an ideal yaw rate difference value $\Delta\omega_r$ to be regulated according to the ideal yaw rate signal $\omega_{r*}$ and the practical yaw rate signal $\omega_r$, and transmits the yaw rate difference value $\Delta\omega_r$ to a stability control unit.

The yaw rate calculation unit acquires the practical yaw rate $\omega_r$ by inputting the real-time vehicle speed u and a front wheel steering angle into a whole vehicle steering two-freedom model:

$$\begin{pmatrix} \dot{\beta} \\ \dot{\omega}_r \end{pmatrix} = \begin{pmatrix} \frac{k_1 + k_2}{mu} & \frac{1}{mu^2}(ak_1 - bk_2 - mu^2) \\ \frac{ak_1 - bk_2}{I_Z} & \frac{1}{uI_Z}(a^2k_1 + b^2k_2) \end{pmatrix} \begin{pmatrix} \beta \\ \omega_r \end{pmatrix} - \begin{pmatrix} \frac{k_1}{mu} \\ \frac{ak_1}{I_Z} \end{pmatrix} \delta_f, \text{ and} \quad (1)$$

$$\Delta\omega_r = \omega_r - \omega_r^*. \quad (2)$$

In Formula (1), m is vehicle mass. Iz is rotational inertia of the vehicle around an axis z. $k_1$ and $k_2$ are respectively cornering stiffness of front and rear wheels. $\delta_f$ is the front wheel steering angle. a and b are respectively distances from front and rear axles to a vehicle mass center. u is the advancing speed of the vehicle. $\omega_r$ is the yaw rate. $\beta$ is a sideslip angle.

Step 4: The stability control unit receives the yaw rate difference value $\Delta\omega_r$ input from a yaw rate control unit, and converts the value into a corresponding compensation torque $T_1$. By integrating a compensation torque $T_2$ caused by pavement disturbance and a compensation torque $T_3$ caused by system friction and considering system stability control factors, the μ comprehensive robustness controller is used for control, so as to improve the external disturbance resistance capability of the system. Additionally, a compensation torque $\Delta T$ is transmitted to the dual-motor compensation unit.

$$\Delta T = \Delta T_1 + \Delta T_2 + \Delta T_3 \quad (3).$$

$\Delta T$ is a total compensation torque. $\Delta T_1$ is a compensation torque required for compensating the yaw rate difference value. $\Delta T_2$ is a compensation torque caused by pavement disturbance. $\Delta T_3$ is a compensation torque caused by system friction.

Step 5: A fault tolerance controller receives a compensation torque T from the stability control unit. By receiving the fault tolerance strategy transmitted from the fault tolerance controller, a corresponding compensation strategy is selected to act on the rack mechanism, so as to ensure a good yaw rate control effect and high stability of the vehicle.

There are numerous specific ways in which the present invention can be applied, and the foregoing is merely preferred implementations of the present invention. It will be understood by those of ordinary skill in the art that various modification can be made without departing from the principle of the present invention, and these modifications should also fall within the protection scope of the present invention.

The invention claimed is:

1. A mode switching control method of an active fault tolerance and fault mitigation system based on steer-by-wire dual motors, comprising
continuing to operate both a steering angle motor and a steering torque motor after selecting a corresponding compensation strategy, including
allowing a faulty torque motor to fulfill the function of compensating for the steering angle motor's steering, and
allowing a faulty steering angle motor to fulfill the function of compensating for the torque motor's steering; comprising
1) during driving, transmitting a resistance R2 of the steering angle motor and a resistance R3 of the torque motor, along with current signals 12 and 13, to a motor fault diagnosis unit; determining a motor status based on the resistance and current values by the motor fault diagnosis unit and outputting a relationship between motor current and torque, T=f(I); sending an instruction to a fault-tolerant control strategy unit;
2) receiving, by a fault tolerance control strategy unit, diagnostic results from a fault diagnosis unit, obtaining an operating condition of the angle motor or torque motor; an operation state condition of the steering angle motor or the torque motor, and determining whether the steering angle motor or the torque motor is normal, at fault but semi-functional or completely at fault, by comparing a voltage U2 of the steering angle motor and a voltage U3 of the torque motor to a reference threshold U0;
3) calculating a real-time ideal yaw rate signal ωr* based on a real-time steering wheel angle signal δsw and vehicle speed signal u, according to a variable transmission ratio law; and calculating a desired adjustment in the ideal yaw rate difference Δωr by comparing the ideal yaw rate signal ωr* with an actual yaw rate signal ωr; transmitting the yaw rate difference Δωr to a stability control unit;

4) receiving, by the stability control unit, the yaw rate difference value Δωr, input from a yaw rate control unit; converting the yaw rate difference value Δωr into a corresponding compensation torque $T_1$; and by integrating a compensation torque $T_2$ caused by pavement disturbance and a compensation torque $T_3$ caused by system friction and considering system stability control factors, using au comprehensive robustness controller for control, and transmitting a compensation torque ΔT to a dual-motor compensation unit:

$$\Delta T = \Delta T_1 + \Delta T_2 + \Delta T_3$$

wherein ΔT is a total compensation torque, $\Delta T_1$ is a compensation torque required for compensating the yaw rate difference value, $\Delta T_2$ is a compensation torque caused by pavement disturbance, and $\Delta T_3$ is a compensation torque caused by system friction; and 5) receiving, by a fault tolerance controller, a compensation torque T from a stability control unit, and by receiving a fault tolerance strategy transmitted from the fault tolerance controller, selecting a corresponding compensation strategy to act on a dual-motor execution unit;

wherein when the steering angle motor is functioning normally and the torque motor is at fault but semi-functional, implementing a fault mitigation strategy 1, including allowing steering angle motor to primarily control the vehicle's yaw rate, while the torque motor compensates for the yaw rate controller's feedback by providing the compensation torque $\Delta T_1$;

when the steering angle motor is at fault but semi-functional and the torque motor is functioning normally, implementing fault mitigation strategy 2, including allowing torque motor primary control function of the steering angle motor, while the steering angle motor assumes the role of the torque motor to provide compensatory torque $\Delta T_2$, as fed back by the yaw rate controller.

2. The mode switching control method of an active fault tolerance and fault mitigation system based on steer-by-wire dual motors of claim 1, wherein in step 1, further comprising
employing a Kalman filter for online measurement of resistance, current, and voltage of the steering angle motor and the torque motor, and transmitting identified resistance, current, and voltage signals to the fault tolerance control strategy unit for further processing.

3. The mode switching control method of an active fault tolerance and fault mitigation system based on steer-by-wire dual motors of claim 2, further comprising
accessing if a fault occurred in the steering angle motor or torque motor by monitoring resistance fluctuations beyond a threshold range including when the steering angle motor or torque motor's maximum output voltage exceeds a safety margin voltage, i.e., U≥0.5Umax, U0=0.5 Umax; and in the meantime, identifying the steering angle motor or torque motor to be semi-functional when the motor perform part of its functions and output a certain torque, T=f(I).

4. The mode switching control method of an active fault tolerance and fault mitigation system based on steer-by-wire dual motors of claim 1, wherein
semi-functional as is defined as U2≥U0 or U3≥U0, forming a fault vector table to characterize fault conditions including both operational states and fault condition of the steering motor and torque motor, 0 indicates normal operation of the steering motor; 1 indicates semi-functional operation of the steering motor, 2 indicates the steering motor is not operational (total failure); 3 indicates normal operation of the torque motor, 4 indicates semi-functional operation of the torque motor, and 5 indicates the torque motor is not operational (total failure).

\* \* \* \* \*